United States Patent [19]
Hetzler et al.

[11] Patent Number: 5,947,944
[45] Date of Patent: Sep. 7, 1999

[54] STRETCHED-THINNED FILMS COMPRISING LOW CRYSTALLINITY POLYMERS AND LAMINATES THEREOF

[75] Inventors: Kevin G. Hetzler, Alpharetta; Rob L. Jacobs, Woodstock, both of Ga.

[73] Assignee: Kimberly-Clark Worldwide, Inc., Neenah, Wis.

[21] Appl. No.: 08/777,504

[22] Filed: Dec. 30, 1996

[51] Int. Cl.[6] .............................. A61F 13/15; C08L 23/10
[52] U.S. Cl. ..................... 604/366; 604/370; 428/221; 428/315.5; 525/240
[58] Field of Search ................................ 604/366, 370; 428/315.5, 221; 525/240

[56] References Cited

U.S. PATENT DOCUMENTS

| | | |
|---|---|---|
| 3,338,992 | 8/1967 | Kinney . |
| 3,426,754 | 2/1969 | Bierenbaum et al. . |
| 3,502,538 | 3/1970 | Petersen . |
| 3,679,538 | 7/1972 | Druin et al. . |
| 3,843,761 | 10/1974 | Bierenbaum et al. . |
| 3,844,865 | 10/1974 | Elton et al. . |
| 3,932,682 | 1/1976 | Loft et al. . |
| 4,105,737 | 8/1978 | Suzuki . |
| 4,138,459 | 2/1979 | Brazinsky et al. . |
| 4,257,997 | 3/1981 | Soehngen et al. . |
| 4,340,563 | 7/1982 | Appel et al. . |
| 4,519,909 | 5/1985 | Castro . |
| 4,539,256 | 9/1985 | Shipman . |
| 4,668,566 | 5/1987 | Braun . |
| 4,726,989 | 2/1988 | Mrozinski . |
| 4,791,144 | 12/1988 | Nagou et al. ............................ 521/90 |
| 4,801,494 | 1/1989 | Datta et al. . |
| 4,906,513 | 3/1990 | Kebbell et al. . |
| 4,921,652 | 5/1990 | Tsuji et al. . |
| 4,923,650 | 5/1990 | Antoon, Jr. et al. . |
| 4,994,335 | 2/1991 | Kamaei et al. . |
| 5,008,296 | 4/1991 | Antoon, Jr. et al. . |
| 5,032,450 | 7/1991 | Rechlicz et al. ........................ 428/196 |
| 5,073,316 | 12/1991 | Bizen et al. . |
| 5,169,712 | 12/1992 | Tapp . |
| 5,173,235 | 12/1992 | Kamei et al. . |
| 5,176,953 | 1/1993 | Jacoby et al. . |
| 5,244,482 | 9/1993 | Hassenboehler, Jr. et al. . |
| 5,258,156 | 11/1993 | Kurauchi et al. . |
| 5,467,765 | 11/1995 | Maturaporn . |
| 5,468,807 | 11/1995 | Tsurutani et al. . |
| 5,492,751 | 2/1996 | Butt, Sr. et al. . |
| 5,543,206 | 8/1996 | Austin et al. . |
| 5,560,974 | 10/1996 | Langley ................................ 428/198 |

FOREIGN PATENT DOCUMENTS

| | | |
|---|---|---|
| 0 115 940 A1 | 8/1984 | European Pat. Off. . |
| 115940 | 8/1984 | European Pat. Off. . |
| 0 145 014 A2 | 6/1985 | European Pat. Off. . |
| 145014 | 6/1985 | European Pat. Off. . |
| 0 434 115 A1 | 6/1991 | European Pat. Off. . |
| 0 444 671 A3 | 9/1991 | European Pat. Off. . |
| 0 554 896 A1 | 8/1993 | European Pat. Off. . |
| 0 697 436 A1 | 2/1996 | European Pat. Off. . |
| 03168229 | 7/1991 | Japan . |
| 1151321 | 5/1969 | United Kingdom . |

Primary Examiner—Robert A. Clarke
Assistant Examiner—Catherine Cogut
Attorney, Agent, or Firm—Pauley Petersen Kinne & Fejer

[57] ABSTRACT

The present invention relates to thin, elastomeric films made from low crystallinity propylene copolymers having a crystallinity of less than about 30%. The elastomeric films of the present invention have improved strength in the cross machine direction. The films may be incorporated into laminate materials used in the outer coverings of diapers, training pants, incontinence products and the like.

16 Claims, 2 Drawing Sheets

STRETCHED-THINNED FILMS COMPRISING LOW CRYSTALLINITY POLYMERS AND LAMINATES THEREOF

FIELD OF INVENTION

The present invention is directed to thin, elastomeric films comprising low crystalline polymers and laminates thereof. In addition, the present invention is directed to a method of making such films.

BACKGROUND OF THE INVENTION

The present invention relates to low-crystalline polymer films and laminates thereof. Such materials have a wide variety of uses, especially in the areas of limited use or disposable items.

Elastomeric films have been traditionally used to provide barrier properties in limited use or disposable items. The terms "limited use" and "disposable" mean that the product or component is used only once, or only a small number of times, before being discarded. Examples of such products include, but are not limited to, surgical and health care related products such as hospital drapes and gowns, disposable work wear such as coveralls and lab coats and personal care absorbent articles such as diapers, training pants, incontinence products, sanitary napkins, bandages, wipes and the like. In the area of protective apparel, films are used to prevent cross-exchange of microorganisms between the patient and the wearer. Films are used as the outer covers in personal care absorbent articles to prevent body wastes from contaminating the clothing, bedding and other aspects of the surrounding environment.

Lamination of films has been used to create materials that are impervious. Surgical gowns and the outer covers of premium-priced diapers are some examples. A primary purpose of the film in such laminations is to provide barrier properties. The laminates must also be tough, i.e., have high tensile strength in both the machine direction and the cross machine direction, for durability.

Traditionally, elastomeric films are made from linear polymers such as polyurethanes, linear low density polyethylenes made with metallocene catalysts which are available from The Dow Chemical Company of Midland, Mich. and Exxon Corporation of Houston, Tex., Catalloys which are available from Montell USA of Wilmington, Del. and KRATON® brand polymers which are available from Shell Chemical Company of Houston, Tex. One problem with such linear polymers is that while they provide high tensile strength in the machine direction, the resulting film is weak in the cross machine direction when machine-direction oriented. Thus, the film is not tough and breaks easily. Another problem with traditional linear polymers is that they generally contain high levels of ethylene, and ethylene, while promoting softness, weakens tensile strength. When tensile strength is weak, it takes less force to break the film. In order to prevent breakage, the film must be of a higher gauge, which means a higher cost of manufacture.

A need exists, therefore, for inexpensive elastomeric films that are strong in both the machine direction and the cross machine direction, as well as a process of making the same.

SUMMARY OF THE INVENTION

It has now been found, in accordance with the present invention, that tougher, thinner films having improved strength in the cross machine direction can be made using low crystallinity propylene homopolymers, copolymers and blends thereof. As used herein, the term "low crystallinity propylenes" refers to homopolymers and/or copolymers that are less than about 30% crystalline, as defined by thermal techniques. Crystallinity is determined using differential scanning calorimetry (DSC) by taking the heat of fusion of the second DSC scan and dividing it by 185 Joules per gram (the approximate crystallinity of pure polypropylene). The films of the present invention also exhibit better elongation when stretched.

The films of the present invention contain up to 100% polypropylene with multiple stereoisomers of propylenes in polypropylene and/or ethylene in the polymer backbone. In one embodiment, the low crystalline propylene copolymers are selected from the group consisting of random propylene copolymers having up to 6 weight percent of a comonomer of ethylene and random propylene copolymers having about 10% to about 20% of an $\alpha$-olefin of 4 to 8 carbon atoms. The advantage of using propylene homopolymers and/or copolymers with little or no ethylene content is the closer match of the melting points of the resins used in the film. Typically, there is a significant difference between the melting points of the resins, which means that the resin with the lower melting point tends to burn in the extruder while the resin mixture is being heated enough to melt the resin with the higher melting point.

The present invention is also directed to a process for producing elastomeric films wherein propylene copolymers are used for the machine-direction strength and low crystallinity propylenes are used to improve strength in the cross machine direction. The process includes the steps of providing a low crystallinity propylene homopolymer and/or copolymer, optionally mixing the low crystallinity propylene polymer with filler/pigment in the appropriate proportions and then heating and extruding the mixture into a monolayer or multilayer film.

Such films have a wide variety of uses including, but not limited to, applications in personal care absorbent articles such as the outer covering of diapers, training pants, incontinence products and the like. These same films also may be used in items such as surgical drapes and gowns, as well as in other various articles of clothing, either as the entire article or simply as a component thereof.

The foregoing and other features and advantages of the present invention will become apparent from the following detailed description of the presently preferred embodiments, when read in conjunction with the accompanying examples.

DETAILED DESCRIPTION OF THE PREFERRED EMBODIMENTS

The present invention is directed to elastomeric films and the method of manufacturing the same. The film of the present invention is an elastomeric film containing at least one low crystallinity propylene copolymer and/or homopolymer.

Typically, isotactic homopolymer propylenes are about 50% to about 60% crystalline. The propylenes useful in the present invention have a crystallinity of less than about 30%. The low crystallinity propylenes are selected from the group consisting of random propylene copolymers having up to 6 weight percent of a comonomer of ethylene and random propylene copolymers having about 10% to about 20% of an α-olefin of 4 to 8 carbon atoms. Specific examples include Rexene 13S25A, a 2.5% random ethylene copolymer polypropylene available from The Rexene Corporation of Dallas, Tex.; Rexene FP-D1730, a flexible polyolefin also available from The Rexene Corporation; Shell 6D43, a 3% random ethylene copolymer polypropylene available from Shell Chemical Company of Houston, Tex.; and Shell WRD60-277, a random butylene copolymer polypropylene also available from Shell Chemical Company.

The films made according to the present invention contain up to about 90% low crystallinity propylenes based on the total weight of the film. Preferably, the films contain up to about 75% low crystallinity propylene copolymers and up to about 80% low crystallinity propylene homopolymers. When the low crystallinity propylene copolymers are selected from random propylene copolymers having up to 6 weight percent of a comonomer of ethylene, the ethylene content in the resulting film should be up to about 6%, preferably about 2.5%. When random propylene copolymers having an α-olefin of 4 to 8 carbon atoms are used, the resulting film should have an α-olefin content of up to about 14%, preferably about 5.5%.

The films of the present invention may be formed using any one of the conventional processes known to those familiar with film formation. In general, the low crystallinity propylene copolymer and/or homopolymer may be mixed with a filler/pigment in appropriate proportions. The mixture is then heated and extruded into a monolayer or multilayer film using any one of a variety of film producing processes such as, for example, cast and embossed, chill and flat cast and blown film processes.

Figure 1:
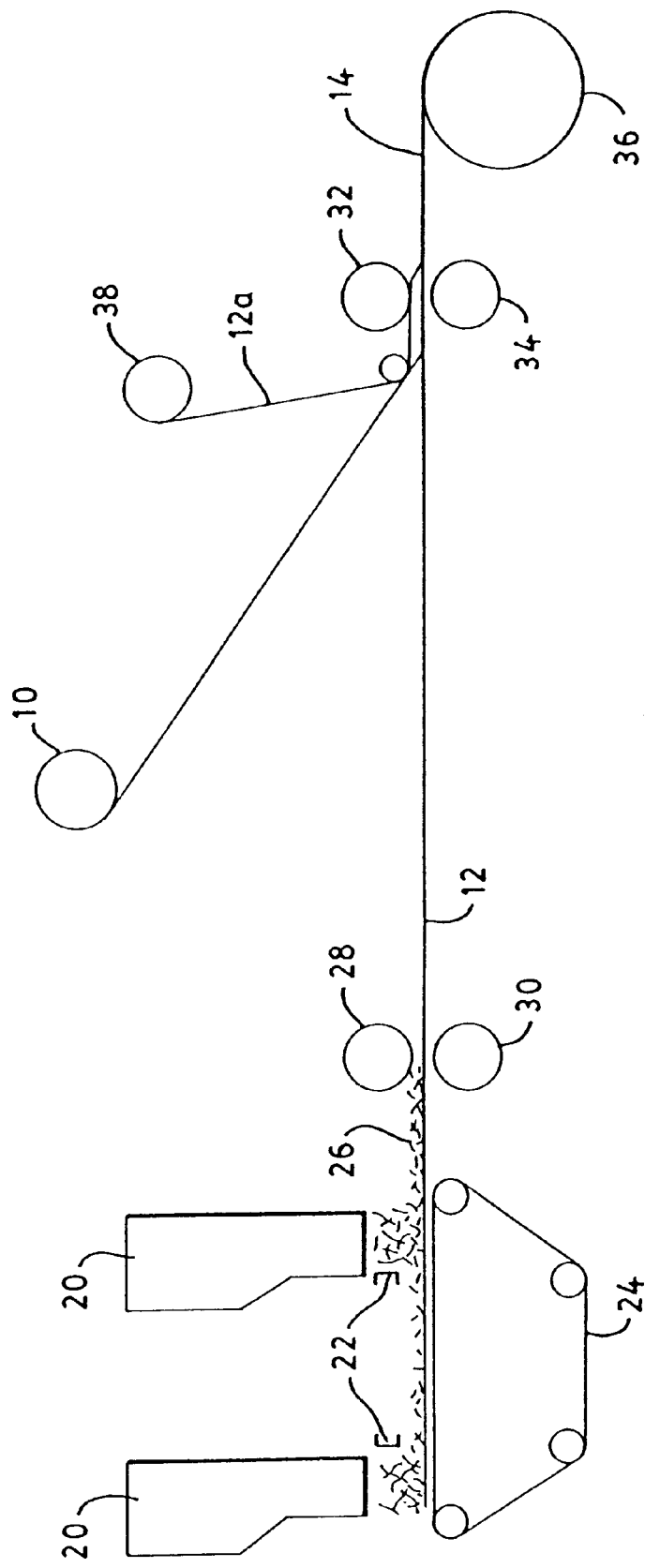
FIG. 1 is a schematic side view of the lamination process of the present invention.

Oftentimes it may be desirable to laminate film 10 to one or more substrates, or support layers, 12 such as is shown in FIG. 1. Support layer materials include, but are not limited to, foams, cellulose webs and other films. Lamination of film 10 may enhance the strength and durability of the film. If desired, film 10 may be attached to one or more support layers 12 to form a laminate 14.

The support layers 30 as shown in FIG. 1 are fibrous non-woven webs such as, for example, necked polypropylene spunbond, crimped polypropylene spunbond, bonded carded webs, elastomeric spunbond and meltblown fabrics produced from elastomeric resins. Fibrous non-woven webs can impart additional properties such as a softer, more cloth-like feel to the film. A more cloth-like feel is particularly advantageous when the film is being used as a barrier layers in, for example, outer covers for personal care absorbent articles, surgical gowns and drapes and other forms of apparel.

The manufacture of fibrous non-woven webs is known. Such webs may be formed from a number of processes including, but not limited to, spunbonding, meltblowing and bonded carded webs processes.

Meltblown fibers are fibers formed by extruding a molten thermoplastic material through a plurality of fine, usually circular, capillaries of a meltblowing die as molten threads or filaments into converging high-velocity, usually hot, gas (e.g., air) streams which are flowing in the same direction as the extruded filaments or threads of the molten thermoplastic material so that the extruded filaments or threads are attenuated, i.e., drawn or extended, to reduce their diameter. The threads or filaments may be attenuated to microfiber diameter which means the threads or filaments have an average diameter not greater than about 75 microns, generally from about 0.5 microns to about 50 microns, and more particularly from about 2 microns to about 40 microns. Thereafter, the meltblown fibers are carried by the high-velocity gas stream and are deposited on a collecting surface to form a web of randomly disbursed meltblown fibers. The meltblown process is well-known and is described in various patents and publications, including NRL Report 4364, "Manufacture of Super-Fine Organic Fibers" by B. A. Wendt, E. L. Boone and D. D. Fluharty; NRL Report 5265, "An Improved Device for the Formation of Super-Fine Thermoplastic Fibers" by K. D. Lawrence, R. T. Lukas and J. A. Young; U.S. Pat. No. 3,676,242 to Prentice; and U.S. Pat. No. 3,849,241 to Buntin et al. The foregoing references are incorporated herein in by reference in their entirety. Meltblown fibers are microfibers which may be continuous or discontinuous, are generally smaller than 10 microns in average diameter and are generally tacky when deposited onto a collecting surface.

Spunbonded fibers are small diameter fibers that are formed by extruding a molten thermoplastic material as filaments from a plurality of fine, usually circular, capillaries of a spinneret with the diameter of the extruded filaments then being rapidly reduced as by, for example, non-eductive or eductive fluid-drawing or other well-known spunbonding mechanisms. The production of spunbonded non-woven webs is illustrated in patents such as, for example, U.S. Pat. No. 4,340,563 to Appel et al.; U.S. Pat. No. 3,802,817 to Matsuki et al.; U.S. Pat. No. 3,692,618 to Dorschner et al; U.S. Pat. No. 3,542,615 to Dobo; U.S. Pat. No. 3,502,763 to Hartman; U.S. Pat. No. 3,502,538 to Peterson; U.S. Pat. Nos. 3,341,394 and 3,338,992 to Kinney; U.S. Pat. No. 3,276,944 to Levy; and Canadian Patent No. 803,714 to Harmon. The disclosures of these patents are herein incorporated by reference in their entirety. Spunbonded fibers generally are not tacky when deposited onto a collecting surface. Spunbonded fibers generally are continuous and have average diameters (from a sample of at least 10) larger than 7 microns and, more particularly, from about 10 microns to about 20 microns.

A plurality of support layers may also be used. Examples of such materials include, for example, spunbond/meltblown laminates and spunbond/meltblown/spunbond laminates such as those taught in U.S. Pat. No. 4,041,203 to Brock et al. which is incorporated herein by reference.

Bonded carded webs are webs made from staple fibers that are usually purchased in bales. The bales are placed in a picker which separates the fibers. The fibers are then sent through a combing or carding unit that breaks apart and aligns the staple fibers in the machine direction to form a generally oriented fibrous non-woven web. Once the web has been formed, it is bonded by one or more of several known bonding methods. One such bonding method is powder bonding wherein a powdered adhesive is distributed through the web and then activated, usually by heating the web and adhesive with hot air. Another bonding method is pattern bonding wherein heated calender rolls or ultrasonic bonding equipment is used to bond the fibers together, usually in a localized bond pattern, though the web can be bonded across its entire surface if desired. Another suitable and well-known method, particularly when using bicomponent staple fibers, is through-air bonding.

Referring again to FIG. 1, a conventional fibrous non-woven web-forming apparatus, such as a pair of spunbond machines 20, is used to form the support layer 12. The long, essentially continuous fibers 22 are deposited onto a forming wire 24 as an unbonded web 26. The unbonded web 26 is then sent through a pair of bonding rolls 28, 30 to bond the fibers together and increase the tear strength of the resultant web support layer 12. One or both of the rolls 28, 30 are often heated to aid bonding. Typically, one of the rolls 28 is also patterned so as to impart a discrete bond pattern with a prescribed bond surface area to the web 12. The other roll is usually a smooth anvil roll, but this roll also may be patterned if desired.

Once the film 10 has been sufficiently stretched and the support layer 12 has been formed, the two layers are brought together and laminated. One method is thermal point bonding. Thermal point bonding involves passing the film 10 and the support layer 12 through the nip formed between a pair of laminating rolls 32, 34. As with the bonding rolls 28, 30, the laminating rolls 32, 34 may be heated. Also, at least one of the rolls 32 may be patterned to create a discrete bond pattern with a prescribed bond surface area for the resultant laminate 14. Generally, the maximum bond point surface area for a given area of surface on one side of the laminate 14 will not exceed about 50% of the total surface area. Any of a number of discrete bond patterns may be used. Examples are disclosed in U.S. Pat. No. 4,041,203 to Brock et al., which is incorporated herein by reference.

Bonding methods other than thermal point bonding may also be used to bond the support layer 12 to the film 10. Suitable alternatives include, for example, adhesive bonding and tackifiers. The adhesive can be applied by, for example, melt spraying, printing or meltblowing. Various types of adhesives are available including those produced from amorphous polyalphaolefins, ethylene vinyl acetate-based hot melts and KRATON® brand adhesives available from Shell Chemical Company of Houston, Tex.

When tackifiers are used to bond the film and the support layer, the tackifier may be incorporated into the film itself. The tackifier essentially serves to increase adhesion between the film and fiber layers. The film and fiber laminate may subsequently be thermal point bonded, although little heat is generally required because the tackifier tends to increase the pressure sensitivity of the film, and a bond somewhat like an adhesive bond can be formed. Examples of useful tackifiers include Wingtack™ 95, available from Goodyear Tire and Rubber Company of Akron, Ohio and Escorez™ 5200, available from Exxon Chemical of Houston, Tex.

Once the laminate 14 exists, it may be wound up into a roll 36 for subsequent processing. Alternatively, the laminate 14 may continue in line for further processing or conversion (not shown).

The process shown in FIG. 1 may also be used to create a three layer laminate. The only modification to the previously described process is to feed a supply 38 of a second fibrous non-woven web 12a into the laminating rolls 32, 34 on the side of the film 10 opposite that of the other support layer 12. One or both of the support layers 12 and 12a may be formed directly in line, as illustrated with support layer 12 in FIG. 1. Alternatively, one or both of the support layers 12 and 12a may be in the form of a pre-formed roll 38 as illustrated in FIG. 1 by support layer 12a. In any event, the second support layer 12a is fed into the laminating rolls 32, 34 and is laminated to film 10 in the same manner as the first support layer 12.

Figure 2:
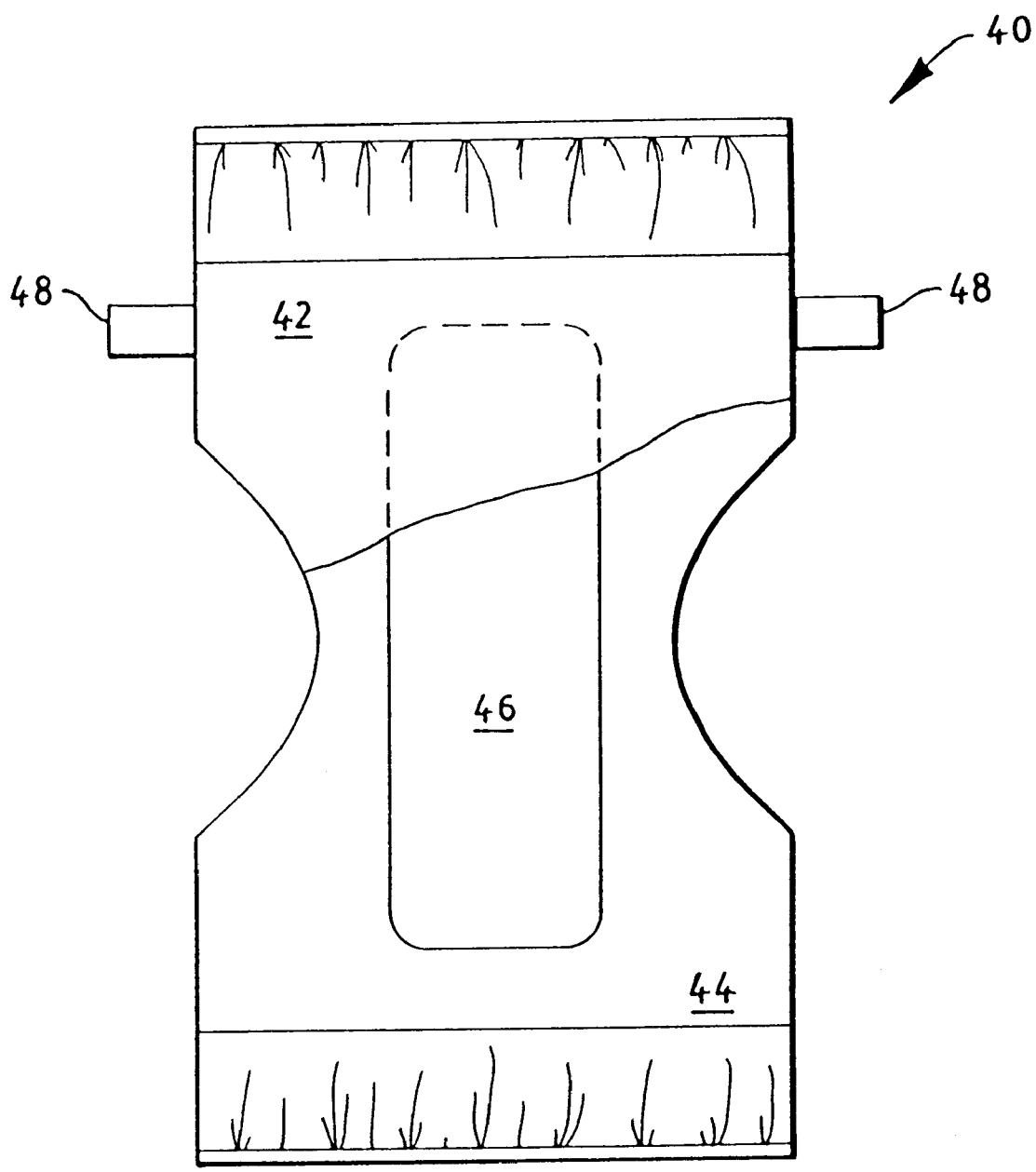
FIG. 2 is a partially cut-away top view of an exemplary disposable garment which may utilize the laminate produced according to the present invention.

As previously stated, film 10 and the resulting laminate 14 may be used in a wide variety of applications including personal care absorbent articles such as diapers, training pants, incontinence garments and feminine hygiene products such as sanitary napkins. A disposable garment 40, in this case a diaper, is shown in FIG. 2. Although a diaper is shown in FIG. 2, it will be understood that use of the film 10 and the laminate 14 produced according to the present invention is not limited to such articles and may also be used in a wide variety of applications. Referring again to FIG. 2, the disposable garment 40 includes a liquid permeable top sheet or liner 42, a back sheet or outer cover 44 and an absorbent core 46 disposed between and contained by the liner 42 and the outer cover 44. Disposable garment 40 may also include some type of fastening means 48 such as adhesive fastening tapes or mechanical hook and loop type fasteners.

Film 10 or laminate 14 may be used to form various portions of disposable garment 40 including, but not limited to, liner 42 and outer cover 44. If the film or laminate is to be used as the liner 42, it will most likely have to be made liquid permeable.

Other uses for the film and film/support layer laminate of the present invention include surgical gowns and drapes, wipers, barrier materials and articles of clothing or portions thereof such as lab coats and other workwear.

The advantages and other characteristics of the present invention are best illustrated by the following examples. It should be understood that the following examples are illustrative and are not limiting.

CONTROL

A control film having an overall composition of 42.3% Montell KS-084P, 39% Exxon 3445, 1% Quantum NA 334 LDPE and 16.8% Quantum 82143 was made. The formulation of the control film was as follows:
 10% Skin Layer A:
  85% Montell KS-084P (polypropylene-based Catalloy)
  10% Exxon 3445 (homopolymer polypropylene)
  5% Quantum NA 334 LDPE (6MI)
 80% Core Layer:
  39% KS-084P
  40% 3445
  21% Quantum 82143 (70% $TiO_2$)
 10% Skin Layer B:
  35% KS-084P
  60% 3445
  5% NA 334 LDPE
The control film contained a few gels with tails, but the overall quality of the film was good.

EXAMPLE 1

Rexene 13S25A replaced Exxon 3445 in the core layer. When this blend entered the extrusion system, the blend contained many unmelted, but tiny, white gels. The temperature profile was adjusted higher in the core layer, which eliminated most of the gels although a few small gels remained. The resulting film also contained more gels with tails than the control.

EXAMPLE 2

Shell 6D43 replaced Exxon 3445 in the core layer. The film produced by this blend had better overall dispersion of $TiO_2$ but still had a higher level than the control of gels with tails. The total frequency of gels in this film was comparative to that of Example 1.

EXAMPLE 3

Shell WRD60-277 replaced Exxon 3445 in the core layer. The film produced with this blend was similar to Example 2 in that the level of gels with tails was higher than that of the control. The dispersion of TiO$_2$ and the film appearance, however, were good.

EXAMPLE 4

Rexene FP-D1730 replaced Montell KS-084P in the core layer. The Rexene FP-D1730 more closely matched the melting points of the other materials in the blend, as compared to the Catalloy because Catalloys have low melting peaks and, therefore, tend to melt first and coat the higher melting Exxon 3445 material. Again, the level of gels with tails was higher in this film than in the control. The resulting film, however, showed a noticeable improvement in the processability, as the gauge leveled out nicely and roll form improved.

EXAMPLE 5

Rexene FP-D1730 replaced Montell KS-084P in the core layer and replaced Exxon 3445 in the skin layers. The resulting film contained a minimal amount of large gels and only a few small gels with tails. The processability, TiO$_2$ dispersion and appearance were very good. The film was very comparable to the control film.

EXAMPLE 6

Shell 6D43 replaced Exxon 3445 in the entire structure, i.e., in the skin layers and the core layer. This blend produced a film very similar to that in Example 5 in terms of appearance, gel levels and roll form.

EXAMPLE 7

Shell WRD60-277 replaced Exxon 3445 in the entire structure. The resulting film was very similar to the films produced in Examples 5 and 6.

EXAMPLE 8

Rexene FP-D1730 replaced Montell KS-084P in all layers and Shell 6D43 replaced Exxon 3445 in all layers. The resulting film had excellent appearance. Film abnormalities such as, for example, gels, contaminants, non-dispersed pigment and carbon specs, were minimal in the unstretched film. Holes, another type of film abnormality, were not present in the unstretched or stretched film.

The control and each of the above examples were subjected to a hand stretchability test wherein the resulting films were stretched by hand. All of the blends, including the control, yielded films that showed good hand stretchability. The films produced using the blends of Examples 5–8, however, showed the best hand stretchability and were more defect tolerant. In other words, the films made using blends of Examples 5–8 could be stretched without resulting in a hole despite the presence of any film abnormalities in the film. The films of Examples 5–8 were followed by the films of Examples 1–4, which were followed by the control.

The control and Examples 5, 6 and 8 were also stretched through a machine-direction orienter under the following conditions: two preheat rolls at a temperature of 185° F., a slow stretch roll and a fast stretch roll and two anneal rolls at a temperature of 190° F. Each 0.0006 inch sample of film was stretched about 62% and retracted about 2.5% before entering the calender. After the samples were stretched, each sample was scanned for defects, i.e., pin holes or thin spots where light comes through the stretched film, using a Fine-line Multicamera Flaw System available from Mayan Automation, Inc. of Lachine, PQ CANADA at a linespeed of 600 fpm. This system can detect defects as small as 0.0148 inches in the cross machine direction. Its ability to detect defects in the machine direction is dependent upon linespeed. For example, it can detect holes as small as 0.055 inches at 300 fpm, holes as small as 0.091 inches at 500 fpm and holes as small as 0.1092 inches at 600 fpm. Table I below shows the results of stretching test.

TABLE I

| Film | Peak Loads (lbs.) | Peak strain (%) | Detects/ 1000 feet |
| --- | --- | --- | --- |
| Control | 5.93 | 243 | 1 |
| Example 5 | 5.68 | 231 | 18 |
| Example 6 | 5.28 | 305 | 3 |
| Example 8 | 5.32 | 444 | 0 |

Peak load refers to the force required to break the film samples. Peak strain refers to the ultimate elongation, or the percentage of the original length to which each sample could be stretched before breaking. As can be seen, Example 8 had excellent elongation properties and no defects. Example 8 is the preferred film according to the present invention. Example 6 also showed good elongation and had very few defects.

Of course, it should be understood that a wide range of changes and modifications can be made to the embodiments described above. It is, therefore, intended that the foregoing description illustrate rather than limit this invention and that it is the following claims, including all equivalents, that define this invention.

We claim:

1. A thin, elastomeric film having improved strength in the cross machine direction comprising at least one low crystallinity polymer selected from the group consisting of low crystallinity propylene homopolymers, copolymers, and blends thereof, wherein the crystallinity of said polymer is less than about 30%.

2. The film of claim 1 wherein said low crystallinity propylene homopolymers, copolymers and blends thereof are present at a level of up to 100% by weight of the thin, elastomeric film.

3. The film of claim 2 wherein said low crystallinity propylene copolymers are present in an amount up to about 75% based on the total weight of said film.

4. The film of claim 2 wherein said low crystallinity propylene homopolymers are present in an amount up to about 80% based on the total weight of said film.

5. The film of claim 3 wherein the low crystallinity propylene homopolymers, copolymers and blends thereof are selected from the group consisting of random polypropylene copolymers having up to 6 weight percent of a comonomer of ethylene, random polypropylene copolymers having from about 10% to about 20% of an α-olefin of 4 to 8 carbon atoms and combinations thereof.

6. The film of claim 2 wherein the low crystallinity propylene homopolymers, copolymers and blends thereof are located in the core layer of the film.

7. The film of claim 2 wherein the low crystallinity propylene homopolymers, copolymers and blends thereof are located in the skin layers of the film.

8. The film of claim 2 wherein the low crystallinity propylene homopolymers, copolymers and blends thereof are located in both the core layer and the skin layers of the film.

9. The film of claim 1, further comprising a particulate filler mixed with the low crystallinity polymer.

10. The film of claim 9, wherein the filler comprises titanium dioxide.

11. A personal care absorbent article comprising a liquid permeable liner and an outer cover with an absorbent core disposed therebetween, wherein said outer cover includes a thin, elastomeric film comprising at least one low crystallinity polymer selected from the group consisting of low crystallinity propylene homopolymers, copolymers and blends thereof, wherein the crystallinity of said polymer is less than about 30%.

12. The personal care absorbent article of claim 11 wherein said article is a diaper.

13. The personal care absorbent article of claim 11 wherein said article is a training pant.

14. The personal care absorbent article of claim 11 wherein said article is an incontinence garment.

15. The personal care absorbent article of claim 11, wherein the film further comprises a particulate filler.

16. The personal care absorbent article of claim 15, wherein the filler comprises titanium dioxide.

* * * * *